United States Patent
Wang (10) Patent No.: US 9,048,996 B2
(45) Date of Patent: Jun. 2, 2015

(54) METHOD AND DEVICE FOR DE-MAPPING ON LTE DOWNLINK CONTROL CHANNEL

(75) Inventor: Shuai Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 310 days.

(21) Appl. No.: 13/641,698

(22) PCT Filed: Oct. 11, 2010

(86) PCT No.: PCT/CN2010/077641
§ 371 (c)(1),
(2), (4) Date: Oct. 17, 2012

(87) PCT Pub. No.: WO2011/147150
PCT Pub. Date: Dec. 1, 2011

(65) Prior Publication Data
US 2013/0039318 A1    Feb. 14, 2013

(30) Foreign Application Priority Data
May 25, 2010    (CN) .......................... 2010 1 0182721

(51) Int. Cl.
*H04L 1/00* (2006.01)

(52) U.S. Cl.
CPC ............ *H04L 1/0071* (2013.01); *H04L 1/0055* (2013.01); *H04L 1/0036* (2013.01)

(58) Field of Classification Search
CPC ....... H04L 1/0036; H04L 1/0071; H04L 1/08; H04L 25/4915; H04L 5/0007; H04L 5/0053; H04W 72/1289; H04W 72/04; H04W 72/1268
USPC ........... 370/241, 211, 281, 329; 375/219, 295
See application file for complete search history.

(56) References Cited

U.S. PATENT DOCUMENTS

2008/0232495 A1* 9/2008 Yu et al. .......................... 375/260
2009/0067378 A1* 3/2009 Luo et al. ....................... 370/329
(Continued)

FOREIGN PATENT DOCUMENTS

| CN | 101594205 A | 12/2009 |
|----|-------------|---------|
| CN | 101605356 A | 12/2009 |

(Continued)

OTHER PUBLICATIONS

International Search Report in international application No. PCT/CN2010/077641, mailed on Dec. 30, 2010.
(Continued)

*Primary Examiner* — Un C Cho
*Assistant Examiner* — Shah Rahman
(74) *Attorney, Agent, or Firm* — Oppedahl Patent Law Firm LLC (57) ABSTRACT

A method for de-mapping on a Long Term Evolution (LTE) downlink control channel is provide, which includes that: a resource element group table and a first parameter are acquired from the configuration parameters, and the resource element group table is analyzed according to the first parameter to acquire a mapping address of Physical Downlink Control Channel (PDCCH) data; a second parameter is acquired from the configuration parameters, and de-cyclic-shift processing is performed on the mapping address of the PDCCH data according to the second parameter to acquire a de-cyclic-shift address; and a third parameter is acquired from the configuration parameters, and de-interleaving processing is performed on the de-cyclic-shift address according to the third parameter to acquire a de-mapping address. Accordingly, a device for de-mapping on an LTE downlink control channel is also provided.

13 Claims, 7 Drawing Sheets

(56) References Cited

U.S. PATENT DOCUMENTS

| | | | |
|---|---|---|---|
| 2009/0097447 A1* | 4/2009 | Han et al. | 370/330 |
| 2009/0168922 A1 | 7/2009 | Malladi | |
| 2009/0209247 A1* | 8/2009 | Lee et al. | 455/422.1 |
| 2010/0197302 A1* | 8/2010 | Chen et al. | 455/434 |
| 2010/0260036 A1* | 10/2010 | Molnar et al. | 370/203 |
| 2010/0279628 A1* | 11/2010 | Love et al. | 455/70 |
| 2011/0038303 A1* | 2/2011 | Ji et al. | 370/315 |
| 2012/0044921 A1* | 2/2012 | Chung et al. | 370/338 |
| 2013/0039318 A1* | 2/2013 | Wang | 370/329 |

FOREIGN PATENT DOCUMENTS

| | | |
|---|---|---|
| WO | 2009058905 A2 | 5/2009 |
| WO | 2010016596 A1 | 2/2010 |

OTHER PUBLICATIONS

English Translation of the Written Opinion of the International Search Authority in international application No. PCT/CN2010/077641, mailed on Dec. 30, 2010.

* cited by examiner

METHOD AND DEVICE FOR DE-MAPPING ON LTE DOWNLINK CONTROL CHANNEL

TECHNICAL FIELD

The present disclosure relates to the field of communications, and particularly to a method and a device for de-mapping on a long term evolution (LTE) downlink control channel.

BACKGROUND

LTE is an evolved 3G, and improves and enhances an air interface access technology of the 3G with high data rate, grouped transmission, reduced delay, wide coverage, downward compatibility and the like.

Six downlink physical channels and three uplink physical channels are defined in the LTE protocol. Wherein, Physical Downlink Control Channels (PDCCHs) are distributed in a plurality of Orthogonal Frequency Division Multiplexing (OFDM) symbols indicated by a Physical Control Form Indicator Channel (PCFICH) and mapped according to a given rule and in unit of Resource Element Group (REG). In a design of a baseband receiving chip of a terminal, a PDCCH de-mapping device plays an important role in a correct PDCCH decoding.

However, in different working scenes, PDCCH mapping rules are different. Thus, a baseband receiving chip of a terminal must be designed to conform to the corresponding mapping rule for a specific working scene. In order to utilize resources effectively, there is an urgent need to design a device applicable to de-mapping on LTE downlink control channels according to a plurality of mapping rules.

SUMMARY

The main purpose of the present disclosure is to provide a method and a device for de-mapping on a Long Term Evolution (LTE) downlink control channel, to realize to de-map PDCCH data in different scenes.

The disclosure provides a method for de-mapping on an LTE downlink control channel, which is used for de-mapping a received Physical Downlink Control Channel (PDCCH) packet, wherein the PDCCH packet contains PDCCH data needed to be analyzed and configuration parameters, the method includes that:

a resource element group table and a first parameter are acquired from the configuration parameters, and the resource element group table is analyzed according to the first parameter to acquire a mapping address of the PDCCH data;

a second parameter is acquired from the configuration parameters, and de-cyclic-shift processing is performed on the mapping address of the PDCCH data according to the second parameter to acquire a de-cyclic-shift address;

and a third parameter is acquired from the configuration parameters, and de-interleaving processing is performed on the de-cyclic-shift address according to the third parameter to acquire a de-mapping address.

Preferably, that a resource element group table and a first parameter are acquired from the configuration parameters and the resource element group table is analyzed according to the first parameter to acquire a mapping address of the PDCCH data may include that:

the resource element group table and the first parameter are acquired from the configuration parameters, wherein the first parameter includes location information of is the PDCCH data needed to be analyzed in the resource element group table;

a corresponding resource element group is latched according to the first parameter;

and the number of effective resource element groups before the one where the PDCCH data exists in the resource element group table is calculated, and the mapping address of the PDCCH data is acquired.

Preferably, that a second parameter is acquired from the configuration parameters and de-cyclic-shift processing is performed on the mapping address of the PDCCH data according to the second parameter to acquire a de-cyclic-shift address may include that:

the second parameter is acquired from the configuration parameters, wherein the second parameter includes an offset address and a modulus value;

the mapping address and the offset address of the PDCCH data are accumulated to acquire an accumulated address;

and a modulo operation is performed on the accumulated address to acquire a de-cyclic-shift address.

Preferably, that a third parameter is acquired from the configuration parameters and de-interleaving processing is performed on the de-cyclic-shift address according to the third parameter to acquire a de-mapping address may include that:

the third parameter is acquired from the configuration parameters, wherein the third parameter includes a de-interleaving table, a NULL table and a comparison address;

the de-cyclic-shift address is compared with the comparison address to acquire a pre-de-interleaving column address;

the NULL table is queried to acquire the number of NULLs needed to be inserted before the de-cyclic-shift address;

an interleaving table is queried to acquire a post-de-interleaving column address;

a post-de-interleaving row address is acquired by calculation according to the pre-de-interleaving column address and the number of the NULLs needed to be inserted before the de-cyclic-shift address;

and a de-mapping address is acquired by calculation according to the post-de-interleaving column address, the post-de-interleaving row address and the number of the NULLs needed to be inserted before the de-cyclic-shift address.

Preferably, that a post-de-interleaving row address is calculated by calculation according to the pre-de-interleaving column address and the number of the NULLs needed to be inserted before the de-cyclic-shift address may include that:

the number of the NULLs needed to be added before the de-cyclic-shift address is added to the de-cyclic-shift address to acquire a first accumulated value;

the number of resource element groups in each column before the de-cyclic-shift address is accumulated to acquire a second accumulated value;

a subtraction operation is performed on the first and second accumulated values to acquire a post-de-interleaving row address.

The present disclosure further provides a device for de-mapping on an LTE downlink control channel, which includes:

a resource element group analysis unit configured to acquire a resource element group table and a first parameter from configuration parameters, and analyze the resource element group table according to the first parameter to acquire a mapping address of PDCCH data;

a de-cyclic-shift unit configured to acquire a second parameter from the configuration parameters and performing de-cyclic-shift processing on the mapping address of the PDCCH data according to the second parameter to acquire a de-cyclic-shift address;

and a de-interleaving processing unit for configured to acquire a third parameter from the configuration parameters and perform a de-interleaving processing on the de-cyclic-shift address according to the third parameter to acquire a de-mapping address.

Preferably, the resource element group analysis unit may include:

a first parameter acquisition subunit configured to acquire the resource element group table and the first parameter from the configuration parameters, wherein the first parameter includes location information of PDCCH data needed to be analyzed in the resource element group table;

a latching subunit configured to latch a corresponding resource element group according to the first parameter;

and a calculation subunit configured to calculate the number of effective resource element groups before the one where the PDCCH data exists in the resource element group table, and acquiring the mapping address of the PDCCH data.

Preferably, the de-cyclic-shift unit may include:

a second parameter acquisition subunit configured to acquire the second parameter from the configuration parameters, wherein the second parameter includes an offset address and a modulus value;

an accumulation unit configured to accumulate the mapping address and the offset address of the PDCCH data to acquire an accumulated address;

and a modulo operation subunit configured to perform a modulo operation on the accumulated address to acquire a de-cyclic-shift address.

Preferably, the de-interleaving processing unit may include:

a third parameter acquisition subunit configured to acquire the third parameter from the configuration parameters, wherein the third parameter includes an interleaving table, an NULL table and a comparison address;

an address comparison subunit configured to compare the de-cyclic-shift address with the comparison address to acquire a pre-de-interleaving column address;

an inserted element querying subunit configured to query the NULL table to acquire the number of NULLs needed to be inserted before the de-cyclic-shift address;

a column address acquisition subunit configured to acquire a post-de-interleaving column address based on querying of an interleaving table;

a row address acquisition subunit configured to acquire a post-de-interleaving row address by calculation according to the pre-de-interleaving column address and the number of the NULLs needed to be inserted before the de-cyclic-shift address;

and a de-mapping address acquisition subunit configured to acquire a de-mapping address by calculation according to the post-de-interleaving column address, the post-de-interleaving row address and the number of the NULLs needed to be inserted before the de-cyclic-shift address.

Preferably, the row address acquisition subunit may be specifically configured to:

add the number of the NULLs needed to be added before the de-cyclic-shift address to the de-cyclic-shift address to acquire a first accumulated value;

accumulate the number of resource element groups in each column before the de-cyclic-shift address to acquire a second accumulated value;

and perform a subtraction operation on the first and second accumulated values to acquire a post-de-interleaving row address.

In the method and the device for de-mapping on an LTE downlink control channel according to the disclosure, de-mapping of PDCCH data can be realized in different scenes by using a pipelining processing structure in combination with configuring corresponding configuration parameters by a software, such that limited hardware resources can be utilized to the greatest extent and the PDCCH data can be de-mapped at the lowest power consumption within a shorter delay time.

DETAILED DESCRIPTION

It should be appreciated that, embodiments described herein are merely used for the purpose of illustration but not intended to limit the present disclosure.

PDCCHs are distributed in a plurality of OFDM symbols indicated by a PCFICH and mapped according to a given rule and in unit of REG. A mapping of a PDCCH refers to a resource mapping that is performed in unit of REG, and the mapping rule is determined by the number of transmitting antennas and a cyclic prefix mode or the number of OFDM symbols.

In the present disclosure, PDCCH data can be de-mapped in different scenes by using a hardware structure in combination with configuring corresponding configuration parameters by a software. An LTE system packets the configuration parameters and downlink data together; the hardware structure selects, in a pipeline manner, a corresponding parameter according to a configuration parameter of a packet header at each level of a pipeline and performs a corresponding de-mapping processing. Thus, limited hardware resources can be fully utilized to the greatest extent, and PDCCH data can be de-mapped at the lowest power consumption within a shorter delay time.

Figure 1:
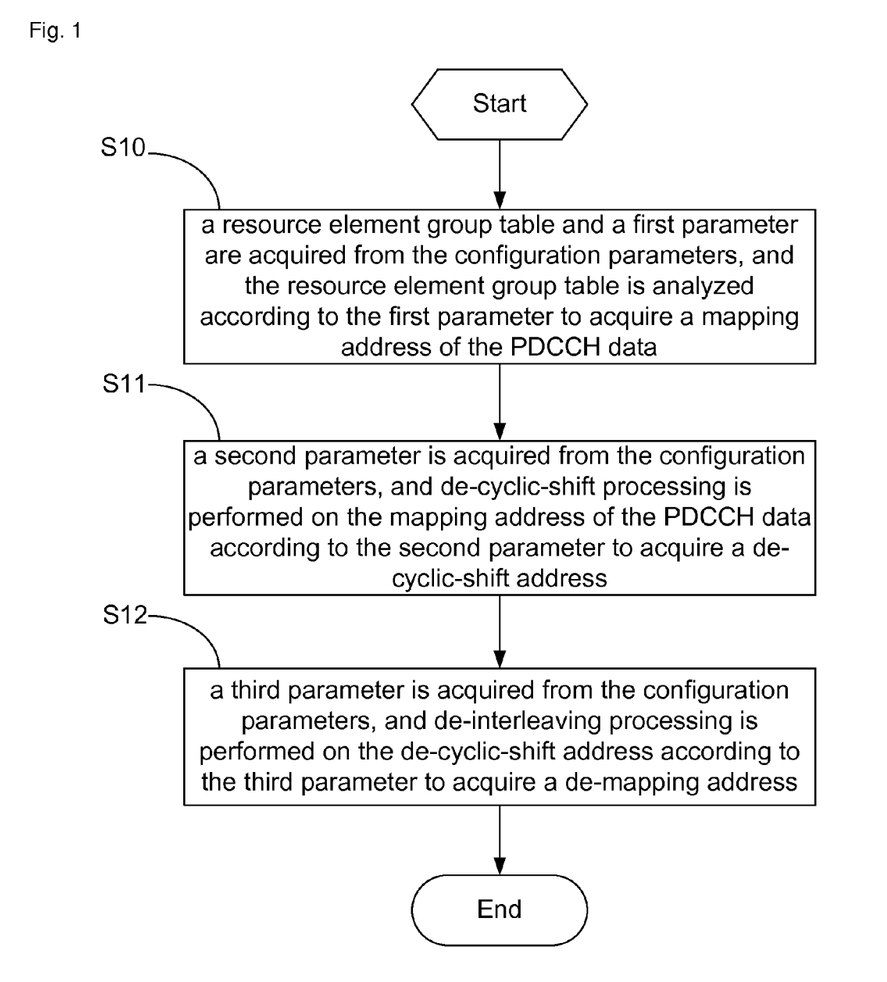
FIG. 1 is a flow diagram illustrating a method for de-mapping on an LTE downlink control channel according to one embodiment of the disclosure.

FIG. 1 is a flow diagram illustrating a method for de-mapping on an LTE downlink control channel according to one embodiment of the disclosure.

The method for de-mapping on the LTE downlink control channel according to the embodiment is used for de-mapping a received PDCCH packet, wherein the PDCCH packet contains PDCCH data needed to be analyzed and configuration parameters, and the method includes that:

Step S10: a resource element group table and a first parameter are acquired from the configuration parameters, and the resource element group table is analyzed according to the first parameter to acquire a mapping address of the PDCCH data.

In Step S10, the REG table is formed by performing mapping on the PDCCH data in unit of REG according to a corresponding mapping rule. The mapping rule is determined by the number of transmitting antennas and a cyclic prefix mode or the number of OFDM symbols. Therefore, the REG table and the first parameter are set respectively according to different mapping rules.

Step S11: a second parameter is acquired from the configuration parameters, and de-cyclic-shift processing is performed on the mapping address of the PDCCH data according to the second parameter to acquire a de-cyclic-shift address;

and Step S12: a third parameter is acquired from the configuration parameters, and de-interleaving processing is performed on the de-cyclic-shift address according to the third parameter to acquire a de-mapping address.

Figure 2:
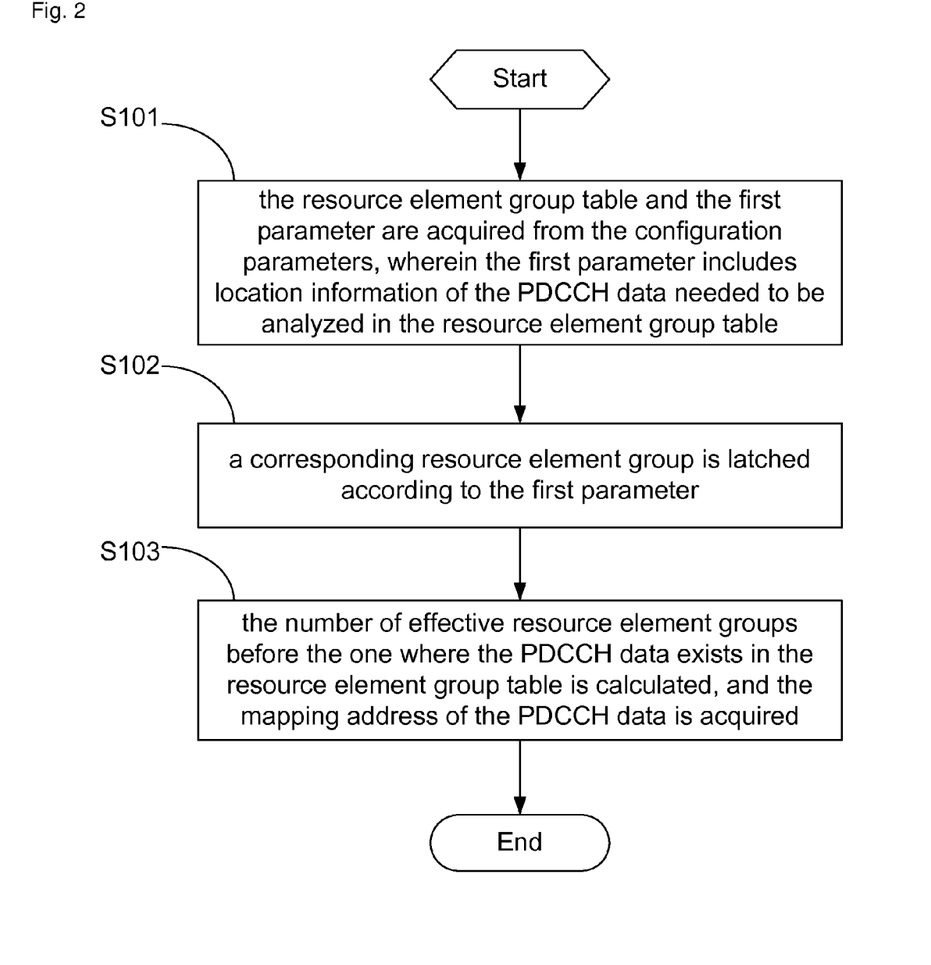
FIG. 2 is a flow diagram illustrating a step of acquiring an mapping address of PDCCH data according to the embodiment of FIG. 1.

Referring to FIG. 2, Step S10 further includes:

Step S101: the resource element group table and the first parameter are acquired from the configuration parameters, wherein the first parameter includes location information of the PDCCH data needed to be analyzed in the resource element group table.

The de-mapped REG table is a mapping distribution table formed by performing a resource mapping on the PDCCH data according to a correspond mapping rule, the first parameter is generated adaptively with the mapping rule so that location of the PDCCH data in the resource element group table can be analyzed according to the de-mapped resource element group table and the first parameter.

Step S102: a corresponding resource element group is latched according to the first parameter.

The value corresponding to each REG in the de-mapped resource element group table may be 0, 1, or Null. When the value is 1, the corresponding REG is an effective REG. A corresponding resource element group is latched according to the first parameter, so that the number of effective resource element groups can be calculated.

Step S103: the number of effective resource element groups before the one where the PDCCH data exists in the resource element group table is calculated, and the mapping address of the PDCCH data is acquired.

The number of the effective REGs before the location appointed by the first parameter in the resource element group table, i.e., the mapping address of the PDCCH data, is calculated according to the location appointed by the first parameter. After Step S103, the method may further include that: it is determined whether to accumulate the number of the effective resource element groups in a resource block before the resource block where the resource element group exists, if yes, the number of the effective REGs in the REG table before the location appointed by the first parameter and the number of the effective resource element groups in a resource block before the resource block where the REG exists are accumulated and the final mapping address of the PDCCH data is acquired.

Figure 3:
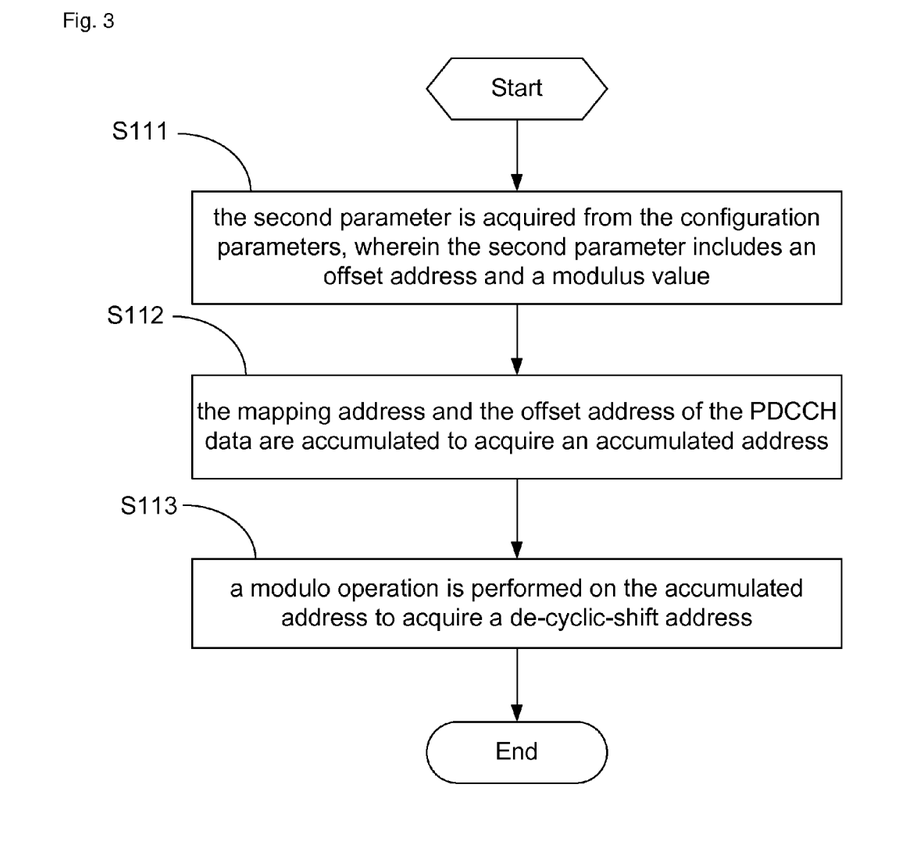
FIG. 3 is a flow diagram illustrating a step of acquiring a de-cyclic-shift address according to the embodiment of FIG. 1.

Referring to FIG. 3, Step S11 further includes:

Step S111: the second parameter is acquired from the configuration parameters, wherein the second parameter includes an offset address and a modulus value.

Step S112: the mapping address and the offset address of the PDCCH data are accumulated to acquire an accumulated address.

and Step S113: a modulo operation is performed on the accumulated address to acquire a de-cyclic-shift address.

Figure 4:
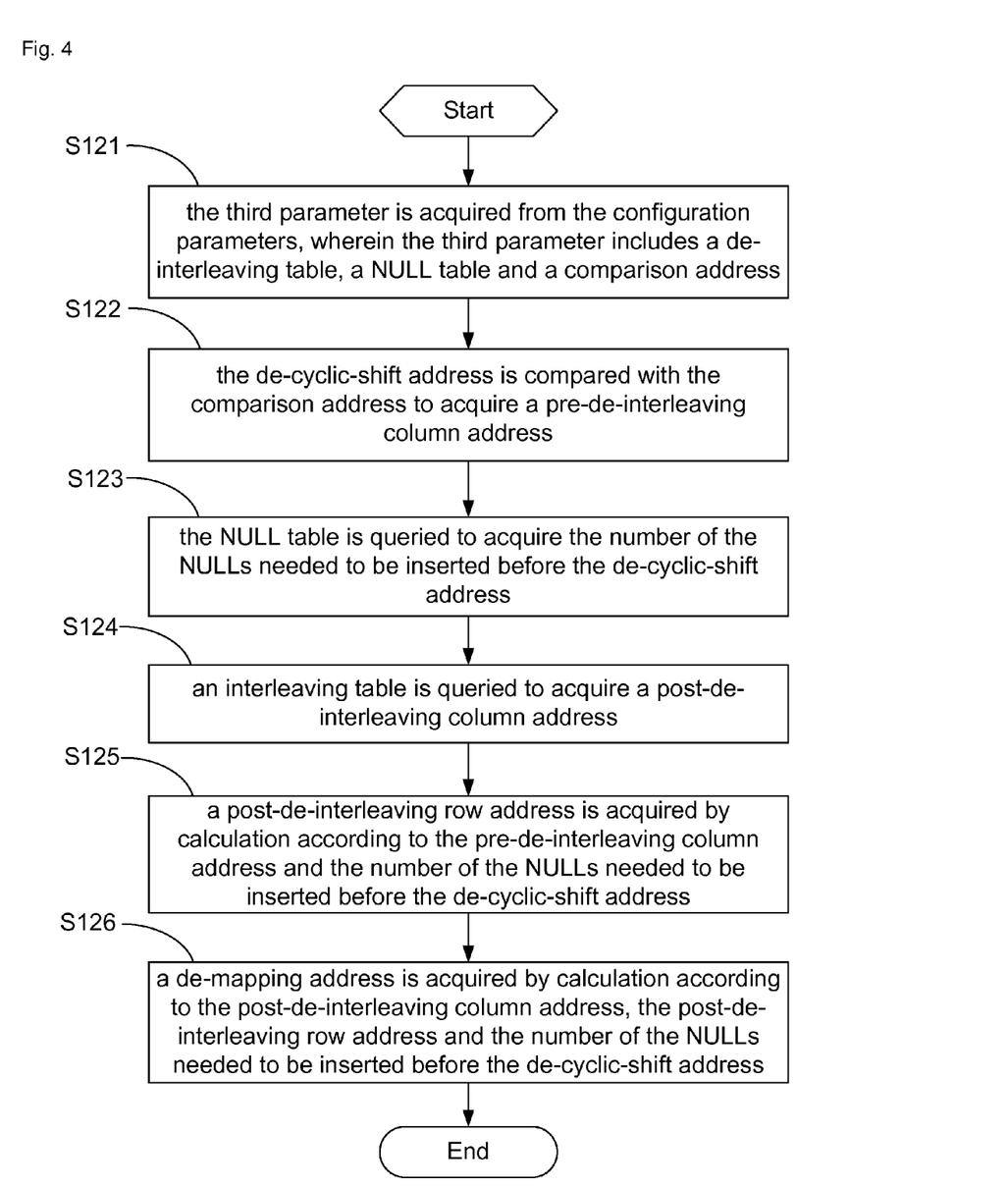
FIG. 4 is a flow diagram illustrating a step of acquiring a de-mapping address according to the embodiment of FIG. 1.

Referring to FIG. 4, Step S12 further includes:

Step S121: the third parameter is acquired from the configuration parameters, wherein the third parameter includes a de-interleaving table, a NULL table and a comparison address.

The interleaving table, the NULL table and the comparison address are acquired by calculation of a software according to the modulus value in the second parameter. Preferably, the comparison address is a sample address selected from 32 addresses as needed. In the embodiment, the 32 addresses are stored in registers R0-R31 respectively, and the addresses stored in the registers R2, R4, R6, ..., R30 can be used as the sample addresses.

Step S122: the de-cyclic-shift address is compared with the comparison address to acquire a pre-de-interleaving column address.

The pre-de-interleaving column address can be acquired by comparing the addresses in the registers R2, R4, R6, ..., R30 with the de-cyclic-shift address respectively.

Step S123: the NULL table is queried to acquire the number of the NULLs needed to be inserted before the de-cyclic-shift address.

By querying the NULL table, the number of the NULLs needed to be inserted before the de-cyclic-shift address can be acquired.

Step S124: an interleaving table is queried to acquire a post-de-interleaving column address.

Step S125: a post-de-interleaving row address is acquired by calculation according to the pre-de-interleaving column address and the number of the NULLs needed to be inserted before the de-cyclic-shift address.

Specifically, Step 125 includes the following steps:

Step A: the number of the NULLs needed to be added before the de-cyclic-shift address is added to the de-cyclic-shift address to acquire a first accumulated value.

Step B: the number of resource element groups in each column before the de-cyclic-shift address is accumulated to acquire a second accumulated value.

and Step C: a subtraction operation is performed on the first and second accumulated values to acquire a post-de-interleaving row address.

Step S126: a de-mapping address is acquired by calculation according to the post-de-interleaving column address, the post-de-interleaving row address and the number of the NULLs needed to be inserted before the de-cyclic-shift address.

According to the pre-de-interleaving row address, the pre-de-interleaving column address and the number of the NULLs needed to be inserted, the de-mapping address can be acquired by subtracting the number of the NULLs from a product of the row address and the column address.

The PDCCH data is cached, according to the de-mapping address, into a corresponding storage unit for MI blind detect.

The method for de-mapping on an LTE downlink control channel according to the embodiment applies a pipeline technology to the resource group location analysis, the de-cyclic-shift and the de-interleaving and controls a de-mapping process by inputting different parameters according to different scenes, resulting in a simplified structure and a reduced resource occupation.

A specific de-mapping flow be described based on an example involving system bandwidths of six resource blocks, the single-antenna port transmission scheme, a normal cyclic prefix and 4 OFDM symbols used for transmission of PDCCHs in a subframe hereinafter. First, the mapping processing for PDCCH data is started when a PDCCH packet is received.

(1) Resource Element Group Analysis

First, an REG table and a first parameter are acquired from configuration parameters. The REG table is shown as FIG. 5, and it can be known from k=1 and l=2 in the first parameter, the location of the PDCCH data to be analyzed is the resource grid location of the second REG of the third OFDM symbol, as shown the shaded grid in FIG. 5. By calculating the number of the effective REGs before the resource grid according to the resource grid location, it can be acquired that the de-mapping address of the PDCCH data is 3.

Figure 5:
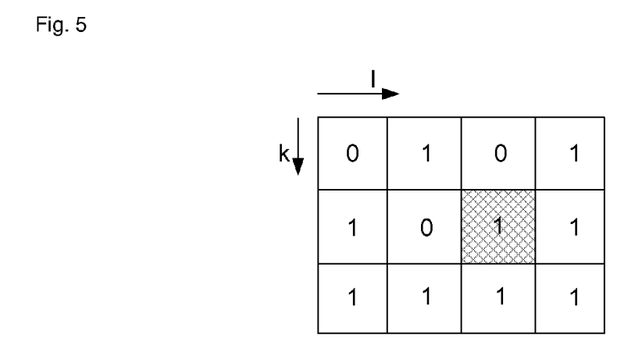
FIG. 5 is a schematic diagram illustrating a Resource Element Group (REG) table showing a mapping distribution of Physical Downlink Control Channel (PDCCH) data according to the embodiment of FIG. 1.

In the resource element group analysis, it may be further determined whether there is a need to accumulate effective REGs in a resource block before the one where the REG exists. If it is determined that there is a need to perform the accumulation, then the number of the effective REGs is accumulated; it is assumed that the number of the effective REGs in the resource block before the one where the REG exists is 43, that is, the final mapping address of the PDCCH data is acquired to be 46; and if it is determined that there is no need to perform the accumulation, then the final mapping address of the PDCCH data is acquired to be 3.

(2) De-Cyclic Shift

First, a second parameter is acquired, and it can be seen from the configuration parameters that an offset address is 6 and a modulus value is 80. By performing de-cyclic shift processing on the mapping address of the PDCCH data according to the second parameter, it can be acquired that the de-cyclic shift address is 54.

(3) De-interleaving

First, a third parameter is acquired, and the third parameter includes an interleaving table, a NULL table and a comparison address that are acquired by computation according to a modulus value. The computation method here has been recorded in detail in the LTE protocol and is therefore not repeatedly described herein. Then, the de-cyclic shift address 54 is compared with 15 sample addresses selected from the comparison addresses respectively to acquire two sample addresses that are respectively located before and after a de-cyclic shift address 54, then the two sample addresses are compared with the de-cyclic shift address to acquire the column address of the de-cyclic shift address in the resource grid. It is assumed that it is obtained from comparison of the de-cyclic shift address 54 with the 24th sample address in the comparison addresses that the pre-de-interleaving column address is 23, then it can be obtained by querying the interleaving table that the column address of the de-interleaved de-cyclic shift address in the resource element group table is 28, i.e., the 29th column: it can be obtained by querying the NULL table that the number of the NULLs needed to be inserted before the de-cyclic shift address 54 is 16, then the post-de-interleaving row address can be acquired by computation according to the pre-de-interleaving column address 23 and the number of the NULLs needed to he inserted being 16 as follows: (54+16)−23×3=1. that is, the post-de-interleaving row address is the second row: finally, according to the post-de-interleaving column address 28, the post-de-Interleaving row address 1 and the number of the NULLs needed to be inserted being 16, the de-mapping address can be acquired by computation as follows: 1×32+28−16=44. Therefore, the PDCCH data is stored into a storage unit and the address of which is 44 for MI blind detect.

Figure 6:
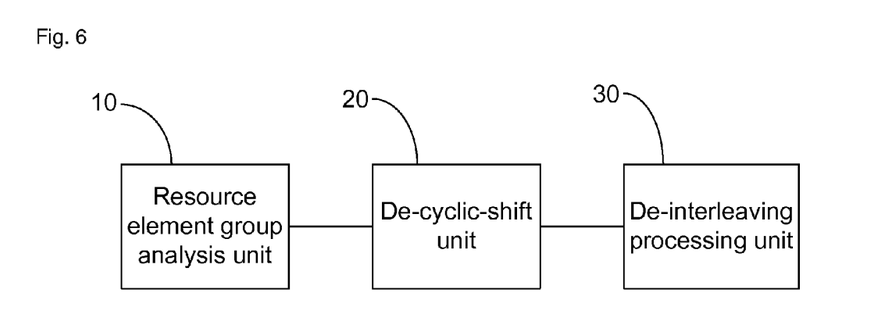
FIG. 6 is a structural diagram illustrating a device for de-mapping on an LTE downlink control channel according to another embodiment of the disclosure.

FIG. 6 is a structural diagram illustrating a device for de-mapping on an LTE downlink control channel according to another embodiment of the disclosure.

In the embodiment, a device for de-mapping on an LTE downlink control channel includes:

a resource element group analysis unit 10 configured to acquire an REG table and a first parameter from configuration parameters, and analyze the REG table according to the first parameter to acquire a mapping address of PDCCH data;

a de-cyclic-shift unit 20 configured to acquire a second parameter from the configuration parameters and performing a de-cyclic-shift processing on the mapping address of the PDCCH data according to the second parameter to acquire a de-cyclic-shift address;

and a de-interleaving processing unit 30 configured to acquire a third parameter from the configuration parameters and performing de-interleaving processing on the de-cyclic-shift address according to the third parameter to acquire a de-mapping address.

Figure 7:
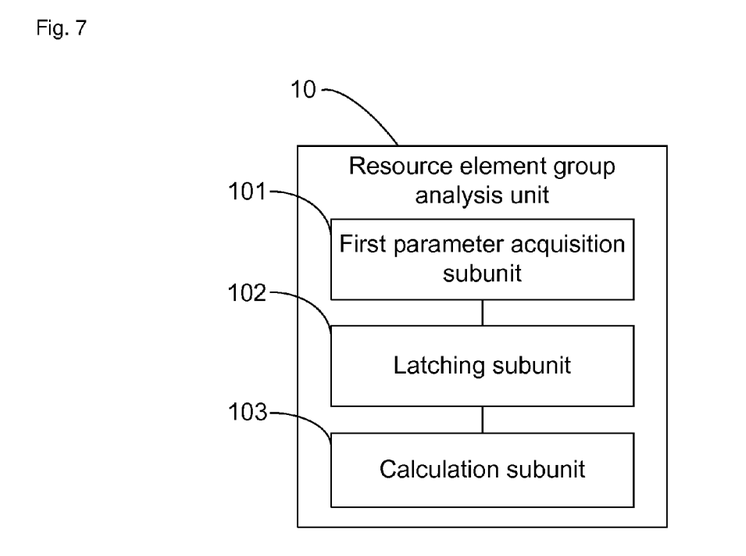
FIG. 7 is a structural diagram illustrating a resource element group analysis unit according to the embodiment of FIG. 6.

Referring to FIG. 7, the resource element group analysis unit 10 includes:

a first parameter acquisition subunit 101 configured to acquire the REG table and the first parameter from the configuration parameters;

a latching subunit 102 configured to latch a corresponding REG according to the first parameter;

and a calculation subunit 103 configured to calculate the number of effective REGs in the REG table before the one where the PDCCH data exists, and acquiring the mapping address of the PDCCH data.

The REG table is formed by performing resource mapping on the PDCCH data in unit of REG according to a corresponding mapping rule. The mapping rule is determined by the number of transmitting antenna ports and a cyclic prefix mode or the number of OFDM symbols. The PDCCH data is mapped according to different mapping rules to form different resource element group tables. Therefore, different parameters are configured according to different mapping rules when a PDCCH data table is de-mapped. For instance, the first parameter here is the location of the PDCCH data needed to be analyzed in resource grid and is recorded as (k, l).

The latching subunit 102 latches a corresponding REG .according to first parameter to facilitate the calculation of the calculation subunit 103. The latching subunit 102 includes a plurality of latches, the number of which can be configured according to different scenes and is therefore not limited herein. The calculation subunit 103 calculates the number of the effective REGs in the REG table stored by the latching subunit 102 to thereby acquire the mapping address for the resource mapping of the PDCCH data. It should be noted here that the value corresponding to each REG in the de-mapped resource element group table may be 0, 1, or Null. When the value is 1, the corresponding REG is an effective REG. The mapping address of the PDCCH data in the REG table is acquired by calculating the number of the effective REGs in the REG table before the REG where the PDCCH data exists.

The calculation subunit 103 is further configured to determine whether to accumulate the number of the effective resource element groups in a resource block before the one where the resource element group exists, if yes, the number of the effective REGs in the REG table before the location appointed by the first parameter and the number of the effective resource element groups in the resource block before the one where the REG exists are accumulated to acquire the final mapping address of the PDCCH data.

Figure 8:
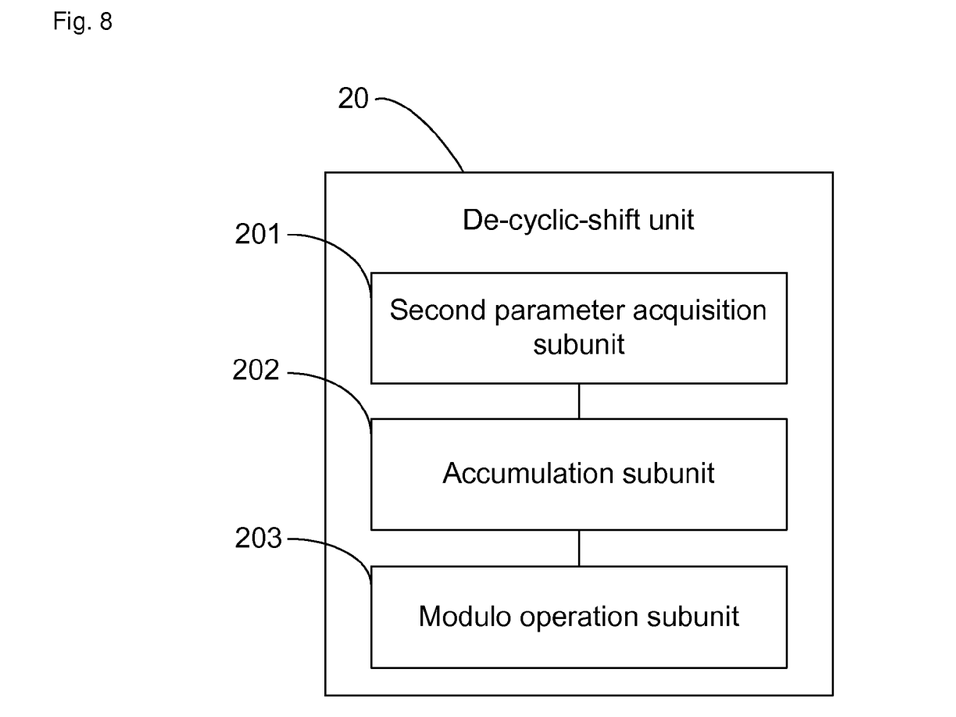
FIG. 8 is a structural diagram illustrating a de-cyclic shift unit according to the embodiment of FIG. 6.

Referring to FIG. 8, the de-cyclic-shift unit 20 includes:

a second parameter acquisition subunit 201 configured to acquire the second parameter from the configuration parameters, wherein the second parameter includes an offset address and a modulus value;

an accumulation subunit 202 configured to accumulate the mapping address and the offset address of the PDCCH data to acquire an accumulated address;

and a modulo operation subunit 203 configured to perform a modulo operation on the accumulated address to acquire a de-cyclic-shift address.

Figure 9:
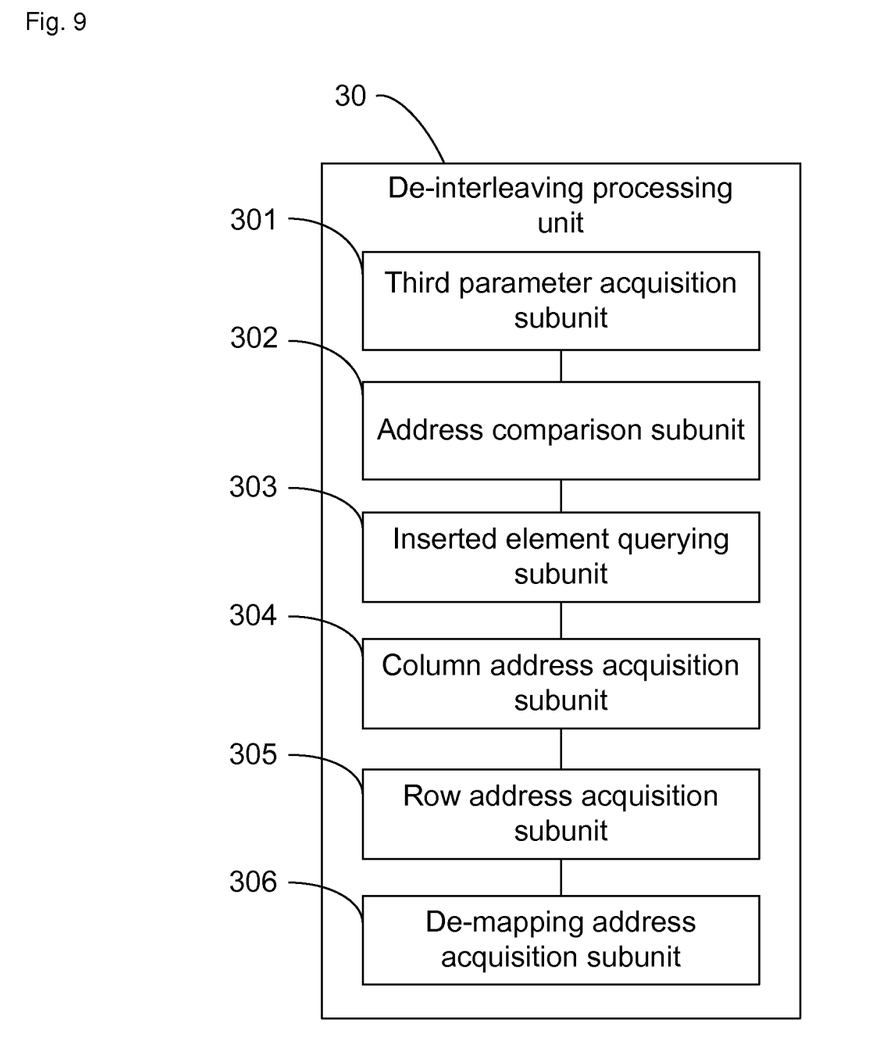
FIG. 9 is a structural diagram illustrating a de-interleaving unit according to the embodiment of FIG. 6.

Referring to FIG. 9, the de-interleaving processing unit 30 includes:

a third parameter acquisition subunit 301 configured to acquire the third parameter is from the configuration parameters, wherein the third parameter includes an interleaving table, a NULL table and a comparison address;

an address comparison subunit 302 configured to compare the de-cyclic-shift address with the comparison address to acquire a pre-de-interleaving column address;

an inserted element querying subunit 303 configured to query the NULL table to acquire the number of the NULLs needed to be inserted before the de-cyclic-shift address;

a column address acquisition subunit 304 configured to acquire a post-de-interleaving column address based on querying of an interleaving table;

a row address acquisition subunit 305 configured to acquire a post-de-interleaving row address by calculation according to the pre-de-interleaving column address and the number of the elements needed to be inserted before the de-cyclic-shift address;

and a de-mapping address acquisition subunit 306 configured to acquire a de-mapping address by calculation according to the post-de-interleaving column address, the post-de-interleaving row address and the number of the NULLs needed to be inserted before the de-cyclic-shift address.

In the third parameter acquisition subunit 301, the interleaving table, the NULL table and the comparison address are acquired by calculation of a software according to the modulus value in the second parameter. Preferably, the comparison address is a sample address selected from 32 addresses as needed. In the embodiment, the 32 addresses are stored in registers R0-R31 respectively, and the addresses stored in the registers R2, R4, R6, ..., R30 can be used as the sample addresses.

The address comparison subunit 302 compares the de-cyclic-shift address with the comparison address to acquire a pre-de-interleaving column address. The inserted element querying subunit 303 queries the NULL table to acquire the number of NULLs needed to be inserted before the de-cyclic-shift address. The column address acquisition subunit 304 acquires a post-de-interleaving column address based on querying of an interleaving table.

The row address calculation subunit 305 is specifically configured to: accumulate the number of the NULLs to be inserted before the de-cyclic shift address and the de-cyclic shift address to acquire a first accumulated value, and then accumulate the number of the REGs in each column before the de-cyclic shift address to acquire a second accumulated value, and at last perform a subtraction operation on the first and second accumulated values to acquire a de-interleaved row address.

The de-mapping address acquisition subunit 36 acquires a de-mapping address by calculation according to the post-de-interleaving column address, the post-de-interleaving row address and the number of the NULLs needed to be inserted before the de-cyclic-shift address. The PDCCH data is cached, according to the de-mapping address, into a corresponding storage unit for MI blind detect.

The device for de-mapping on an LTE downlink control channel provided in the embodiment applies a pipeline technology to the resource group location analysis, the de-cyclic-shift and the de-interleaving, and performs de-mapping processing through configuring different parameters according to different scenes by a software, so that the structure of the device is simple and resource occupation of the device is reduced.

The above are only preferred the embodiments of the present disclosure but are not to be construed as limiting the scope of the present disclosure, and both any equivalent structure or flow modification made by using the content disclosed in the specification or accompanying drawings and any direct or indirect application of the present disclosure to other related technical fields fall within the scope of protection of the present disclosure.

The invention claimed is:

1. A method for de-mapping on a Long Term Evolution (LTE) downlink control channel, used for de-mapping a received Physical Downlink Control Channel (PDCCH) packet, wherein the PDCCH packet containing PDCCH data needed to be analyzed and configuration parameters, the method comprising:

acquiring a resource element group table and a first parameter from the configuration parameters, and analyzing the resource element group table according to the first parameter to acquire a mapping address of the PDCCH data;

acquiring a second parameter from the configuration parameters, and performing de-cyclic-shift processing on the mapping address of the PDCCH data according to the second parameter to acquire a de-cyclic-shift address;

and acquiring a third parameter from the configuration parameters, and performing de-interleaving processing on the de-cyclic-shift address according to the third parameter to acquire a de-mapping address, wherein the acquiring a third parameter from the configuration parameters and performing de-interleaving processing on the de-cyclic-shift address according to the third parameter to acquire a de-mapping address comprises:

acquiring the third parameter from the configuration parameters, wherein the third parameter includes a de-interleaving table, a NULL table and a comparison address;

comparing the de-cyclic-shift address with the comparison address to acquire a pre-de-interleaving column address;

querying the NULL table to acquire the number of NULLs needed to be inserted before the de-cyclic-shift address;

querying the de-interleaving table to acquire a post-de-interleaving column address;

acquiring a post-de-interleaving row address by calculation according to the pre-de-interleaving column address and the number of the NULLs needed to be inserted before the de-cyclic-shift address;

and acquiring a de-mapping address by calculation according to the post-de-interleaving column address, the post-de-interleaving row address and the number of the NULLs needed to be inserted before the de-cyclic-shift address.

2. The method for de-mapping on an LTE downlink control channel according to claim 1, wherein the acquiring a resource element group table and a first parameter from the configuration parameters and analyzing the resource element group table according to the first parameter to acquire a mapping address of the PDCCH data comprises:

acquiring the resource element group table and the first parameter from the configuration parameters, wherein the first parameter includes location information of the PDCCH data needed to be analyzed in the resource element group table;

latching a corresponding resource element group according to the first parameter;

and calculating the number of effective resource element groups before the one where the PDCCH data exists in the resource element group table, and acquiring the mapping address of the PDCCH data.

3. The method for de-mapping on an LTE downlink control channel according to claim 1, wherein the acquiring a second parameter from the configuration parameters and performing de-cyclic-shift processing on the mapping address of the PDCCH data according to the second parameter to acquire a de-cyclic-shift address comprises:

acquiring the second parameter from the configuration parameters, wherein the second parameter includes an offset address and a modulus value;

accumulating the mapping address and the offset address of the PDCCH data to acquire an accumulated address;

and performing a modulo operation on the accumulated address to acquire a de-cyclic-shift address.

4. The method for de-mapping on an LTE downlink control channel according to claim 1, wherein the acquiring a resource element group table and a first parameter from the configuration parameters and analyzing the resource element group table according to the first parameter to acquire a mapping address of the PDCCH data comprises: acquiring the resource element group table and the first parameter from the configuration parameters, wherein the first parameter includes location information of the PDCCH data needed to be analyzed in the resource element group table; latching a corresponding resource element group according to the first parameter; and calculating the number of effective resource element groups before the one where the PDCCH data exists in the resource element group table, and acquiring the mapping address of the PDCCH data;

the acquiring a second parameter from the configuration parameters and performing de-cyclic-shift processing on the mapping address of the PDCCH data according to the second parameter to acquire a de-cyclic-shift address comprises: acquiring, from the configuration parameters, the second parameter including an offset address and a modulus value; accumulating the mapping address and the offset address of the PDCCH data to acquire an accumulated address; and performing a modulo operation on the accumulated address to acquire a de-cyclic-shift address;

the acquiring a third parameter from the configuration parameters and performing de-interleaving processing on the de-cyclic-shift address according to the third parameter to acquire a de-mapping address comprises: acquiring, from the configuration parameters, the third parameter including a de-interleaving table, a NULL table and a comparison address; comparing the de-cyclic-shift address with the comparison address to acquire a pre-de-interleaving column address; querying the NULL table to acquire the number of NULLs needed to be inserted before the de-cyclic-shift address; querying the de-interleaving table to acquire a post-de-interleaving column address; acquiring a post-de-interleaving row address by calculation according to the pre-de-interleaving column address and the number of the NULLs needed to be inserted before the de-cyclic-shift address; and acquiring a de-mapping address by calculation according to the post-de-interleaving column address, the post-de-interleaving row address and the number of the NULLs needed to be inserted before the de-cyclic-shift address.

5. The method for de-mapping on an LTE downlink control channel according to claim 1, wherein the acquiring a post-de-interleaving row address by calculation according to the pre-de-interleaving column address and the number of the NULLs needed to be inserted before the de-cyclic-shift address:

adding the number of the NULLs needed to be added before the de-cyclic-shift address to the de-cyclic-shift address to acquire a first accumulated value;

accumulating the number of resource element groups in each column before the de-cyclic-shift address to acquire a second accumulated value;

performing a subtraction operation on the first and second accumulated values to acquire a post-de-interleaving row address.

6. A device for de-mapping on a Long Term Evolution (LTE) downlink control channel, comprising:

a resource element group analysis unit configured to acquire a resource element group table and a first parameter from configuration parameters, and analyze the resource element group table according to the first parameter to acquire a mapping address of PDCCH data;

a de-cyclic-shift unit configured to acquire a second parameter from the configuration parameters and perform de-cyclic-shift processing on the mapping address of the PDCCH data according to the second parameter to acquire a de-cyclic-shift address:

and a de-interleaving processing unit configured to acquire a third parameter from the configuration parameters and perform de-interleaving processing on the de-cyclic-shift address according to the third parameter to acquire a de-mapping address, wherein the de-interleaving processing unit comprises:

a third parameter acquisition subunit configured to acquire the third parameter from the configuration parameters, wherein the third parameter includes a de-interleaving table, an NULL table and a comparison address;

an address comparison subunit configured to compare the de-cyclic-shift address with the comparison address to acquire a pre-de-interleaving column address;

an inserted element querying subunit configured to query the NULL table to acquire the number of NULLs needed to be inserted before the de-cyclic-shift address;

a column address acquisition subunit configured to acquire a post-de-interleaving column address based on querying of the de-interleaving table;

a row address acquisition subunit configured to acquire a post-de-interleaving row address by calculation according to the pre-de-interleaving column address and the number of the NULLs needed to be inserted before the de-cyclic-shift address;

and a de-mapping address acquisition subunit configured to acquire a de-mapping address by calculation according to the post-de-interleaving column address, the post-de-interleaving row address and the number of the NULLs needed to be inserted before the de-cyclic-shift address, wherein the resource element group analysis unit, the de-cyclic-shift unit, the de-interleaving processing unit, the third parameter acquisition subunit, the address comparison subunit, the inserted element querying subunit, the column address acquisition subunit, the row address acquisition subunit and the de-mapping address acquisition subunit are each the result of execution on a processor of software stored in a memory.

7. The device for de-mapping on an LTE downlink control channel according to claim 6, wherein the resource element group analysis unit comprises:
a first parameter acquisition subunit configured to acquire the resource element group table and the first parameter from the configuration parameters, wherein the first parameter includes location information of PDCCH data needed to be analyzed in the resource element group table;
a latching subunit configured to latch a corresponding resource element group according to the first parameter;
and a calculation subunit configured to calculate the number of effective resource element groups before the one where the PDCCH data exists in the resource element group table, and acquiring the mapping address of the PDCCH data,
where the first parameter acquisition subunit, the latching subunit and the calculation subunit are each the result of execution on a processor of software stored in a memory.

8. The device for de-mapping on an LTE downlink control channel according to claim 6, wherein the de-cyclic-shift unit comprises:
a second parameter acquisition subunit configured to acquire, from the configuration parameters, the second parameter, wherein the second parameter includes an offset address and a modulus value;
an accumulation unit configured to accumulate the mapping address and the offset address of the PDCCH data to acquire an accumulated address;
and a modulo operation subunit configured to perform a modulo operation on the accumulated address to acquire a de-cyclic-shift address,
where the first parameter acquisition subunit, the latching subunit and the calculation subunit are each the result of execution on a processor of software stored in a memory.

9. The device for de-mapping on an LTE downlink control channel according to claim 6, wherein the row address acquisition subunit is specifically configured to:
add the number of the NULLs needed to be added before the de-cyclic-shift address to the de-cyclic-shift address to acquire a first accumulated value;
accumulate the number of resource element groups in each column before the de-cyclic-shift address to acquire a second accumulated value;
and perform a subtraction operation on the first and second accumulated values to acquire a post-de-interleaving row address.

10. The method for de-mapping on an LTE downlink control channel according to claim 2, wherein the acquiring a second parameter from the configuration parameters and performing de-cyclic-shift processing on the mapping address of the PDCCH data according to the second parameter to acquire a de-cyclic-shift address comprises:
acquiring the second parameter from the configuration parameters, wherein the second parameter includes an offset address and a modulus value;
accumulating the mapping address and the offset address of the PDCCH data to acquire an accumulated address;
and performing a modulo operation on the accumulated address to acquire a de-cyclic-shift address.

11. The method for de-mapping on an LTE downlink control channel according to claim 10, wherein the acquiring a third parameter from the configuration parameters and performing de-interleaving processing on the de-cyclic-shift address according to the third parameter to acquire a de-mapping address comprises:
acquiring the third parameter from the configuration parameters, wherein the third parameter includes a de-interleaving table, a NULL table and a comparison address;
comparing the de-cyclic-shift address with the comparison address to acquire a pre-de-interleaving column address;
querying the NULL table to acquire the number of NULLs needed to be inserted before the de-cyclic-shift address;
querying the de-interleaving table to acquire a post-de-interleaving column address;
acquiring a post-de-interleaving row address by calculation according to the pre-de-interleaving column address and the number of the NULLs needed to be inserted before the de-cyclic-shift address;
and acquiring a de-mapping address by calculation according to the post-de-interleaving column address, the post-de-interleaving row address and the number of the NULLs needed to be inserted before the de-cyclic-shift address.

12. The method for de-mapping on an LTE downlink control channel according to claim 4, wherein the acquiring a post-de-interleaving row address by calculation according to the pre-de-interleaving column address and the number of the NULLs needed to be inserted before the de-cyclic-shift address:
adding the number of the NULLs needed to be added before the de-cyclic-shift address to the de-cyclic-shift address to acquire a first accumulated value;
accumulating the number of resource element groups in each column before the de-cyclic-shift address to acquire a second accumulated value;
performing a subtraction operation on the first and second accumulated values to acquire a post-de-interleaving row address.

13. The method for de-mapping on an LTE downlink control channel according to claim 11, wherein the acquiring a post-de-interleaving row address by calculation according to the pre-de-interleaving column address and the number of the NULLs needed to be inserted before the de-cyclic-shift address:
adding the number of the NULLs needed to be added before the de-cyclic-shift address to the de-cyclic-shift address to acquire a first accumulated value;
accumulating the number of resource element groups in each column before the de-cyclic-shift address to acquire a second accumulated value;
performing a subtraction operation on the first and second accumulated values to acquire a post-de-interleaving row address.

* * * * *